United States Patent
Mohan et al.

(10) Patent No.: US 9,380,536 B2
(45) Date of Patent: Jun. 28, 2016

(54) ENHANCED DEVICE SELECTION ALGORITHM FOR DEVICE-TO-DEVICE (D2D) COMMUNICATION

(71) Applicant: QUALCOMM Incorporated, San Diego, CA (US)

(72) Inventors: Prashanth Mohan, Chennai (IN); Parthasarathy Krishnamoorthy, Hyderabad (IN); Krishnakumar Vasanthasenan, Hyderabad (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 14/480,714

(22) Filed: Sep. 9, 2014

(65) Prior Publication Data

US 2016/0073349 A1    Mar. 10, 2016

(51) Int. Cl.
*H04B 1/38* (2015.01)
*H04W 52/02* (2009.01)
*H04W 8/00* (2009.01)
*H04W 76/02* (2009.01)
*H04W 88/06* (2009.01)

(52) U.S. Cl.
CPC .......... *H04W 52/0251* (2013.01); *H04W 8/005* (2013.01); *H04W 52/0229* (2013.01); *H04W 52/0245* (2013.01); *H04W 52/0261* (2013.01); *H04W 76/023* (2013.01); *H04W 88/06* (2013.01)

(58) Field of Classification Search
USPC ....................................................... 455/574
See application file for complete search history.

(56) References Cited

U.S. PATENT DOCUMENTS

| | | |
|---|---|---|
| 8,122,135 B2 | 2/2012 | Motoyama |
| 2011/0059696 A1 | 3/2011 | Rasmussen et al. |
| 2011/0130092 A1 | 6/2011 | Yun et al. |
| 2013/0065529 A1 | 3/2013 | Watanabe |
| 2013/0198270 A1 | 8/2013 | Yamauchi et al. |
| 2014/0112194 A1* | 4/2014 | Novlan ................. H04W 48/16 370/254 |
| 2014/0219095 A1 | 8/2014 | Lim et al. |
| 2014/0307611 A1* | 10/2014 | Tesanovic ............. H04W 8/005 370/312 |

FOREIGN PATENT DOCUMENTS

WO    2014113537 A1    7/2014

OTHER PUBLICATIONS

International Search Report and Written Opinion—PCT/US2015/044130—ISA/EPO—Oct. 16, 2015.

* cited by examiner

*Primary Examiner* — Joel Ajayi
(74) *Attorney, Agent, or Firm* — The Marbury Law Group, PLLC

(57) ABSTRACT

Methods, systems and devices are provided for selecting one or more target devices for device-to-device (D2D) communication with a device. A device processor may determine whether a battery power level of the device is below a threshold battery power level. The device processor may establish a received power level threshold in response to determining that the battery power level of the device is below a threshold power battery level. The device processor may determine whether a received power level of a signal from target devices for D2D communication is above the received power level threshold. In response to determining that the received power level from a target device is above the received power level threshold, the device processor may permit D2D communication with that target device.

30 Claims, 11 Drawing Sheets

ENHANCED DEVICE SELECTION ALGORITHM FOR DEVICE-TO-DEVICE (D2D) COMMUNICATION

BACKGROUND

Device-to-Device (D2D) communication is becoming an increasingly prominent technology feature in user equipment (UE). The use of D2D communication enables a UE to discover and interact with other devices within the D2D communication range, for various purposes including information sharing. Various technologies are used to achieve D2D communications, including communications systems such as LTE Direct and WIFI Direct. Among the various technologies, LTE Direct may be gaining popularity based on the capability of LTE Direct compliant devices to perform device discovery on existing LTE spectrum and infrastructure, while consuming only a small percentage, such as around 1%, of WAN resources. WIFI Direct may also achieve acceptable D2D communication by enabling devices to connect directly with each other without a wireless access point. Some drawbacks of existing D2D communications technologies include the ability to communicate with all devices that are capable of being "seen" by a UE. While such capabilities have advantages, drawbacks arise.

For example, a WiFi Direct enabled UE may exchange device discovery request/response messages with every WiFi Direct devices in its range (e.g., where device presence is discovered). The device discovery is followed by service discovery (e.g., where device capabilities are discovered). A D2D enabled UE may discover only those devices that are within the communication range supported by the UE. However, there may be many devices within communication range. Once the UE discovers other devices in its proximity, D2D communication may be used to exchange data. In conventional D2D device selection approaches, the UE communicates with all of the discovered devices.

Drawbacks arise however, in that when discovered devices are at the outer edge of the UE coverage area, conventional D2D device selection approaches allow the UE to communicate with these far away devices despite the resulting power drain. In particular, the UE must use a greater uplink (Transmit) power level to communicate with devices at the edge of the coverage area compared to the uplink (Transmit) power required to communicate with the nearby devices, which in some instances is significantly less. With conventional device selection, even when the UE battery power is low, there is currently no way to restrict the devices with which the UE may communicate.

SUMMARY

The various embodiments include methods that may be implemented in a wireless device for advantageously selecting one or more target devices for device-to-device (D2D) communication with a device, such as to conserve battery power. An embodiment method may include determining, by a processor of the device, whether a battery power level of the device is below a threshold battery power level, establishing a received power level threshold in response to determining that the battery power level of the device is below the threshold battery power level, and limiting D2D communications with target devices to those target devices whose received signal power levels exceed the established received power level threshold. A device processor may limit D2D communications with target devices to those target devices whose received signal power levels exceed the established received power level threshold by determining whether a received power level of a signal from target devices for D2D communication is above the received power level threshold, and permitting D2D communications with target devices in response to determining that the received power level from target devices is above the received power level threshold.

An embodiment method may further include inhibiting, by the device processor, the D2D communication with target devices in response to determining that the received power level from target devices is not above the received power level threshold. In an embodiment, determining, by a processor of the device, whether the battery power level of the device is below a threshold battery power level may include establishing the threshold battery power level based on a transmit power level that is sufficient to permit D2D communication within a communication range, determining the battery power level, and comparing the determined battery power level to the established threshold battery power level.

In an embodiment, establishing, by the processor of the device, a received power level threshold, in response to determining that the battery power level of the device is below a threshold power battery level may include determining an adjusted transmit power level that is sufficient to permit D2D communication within a restricted range, and establishing the received power level threshold to permit communication with target devices within the restricted range.

In an embodiment, determining, by the processor of the device, whether a received power level of a signal from target devices for D2D communication is above the received power level threshold may include obtaining one or more of: a received power (PRX) level, a received signal strength indicator (RSSI), and a signal to noise ratio (SNR) of the received signal from target devices, and comparing the obtained one or more of the PRX level, the RSSI, and the SNR with the received power level threshold.

In an embodiment, permitting, by the processor of the device, D2D communications with target devices in response to determining that the received power level from target devices is above the received power level threshold may include adding, by the processor, target devices to a list of target devices with which D2D communication is permitted in response to the received power level of the received signal from target devices being above the received power level threshold.

In an embodiment, permitting, by the processor of the device, D2D communications with target devices in response to determining that the received power level from target devices is above the received power level threshold may include removing target devices from a list of target devices with which D2D communication is permitted, or not adding target devices to the list of target devices with which D2D communication is permitted.

The various embodiments include a device having a radio module, a memory and a processor configured with processor executable instructions to perform operations of the above described embodiment methods. The various embodiments include a device having means for performing functions of the operations of the above-described embodiment methods. The various embodiments include a non-transitory processor readable medium may have instructions stored thereon configured to cause a processor to perform operations of the above described embodiment methods.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
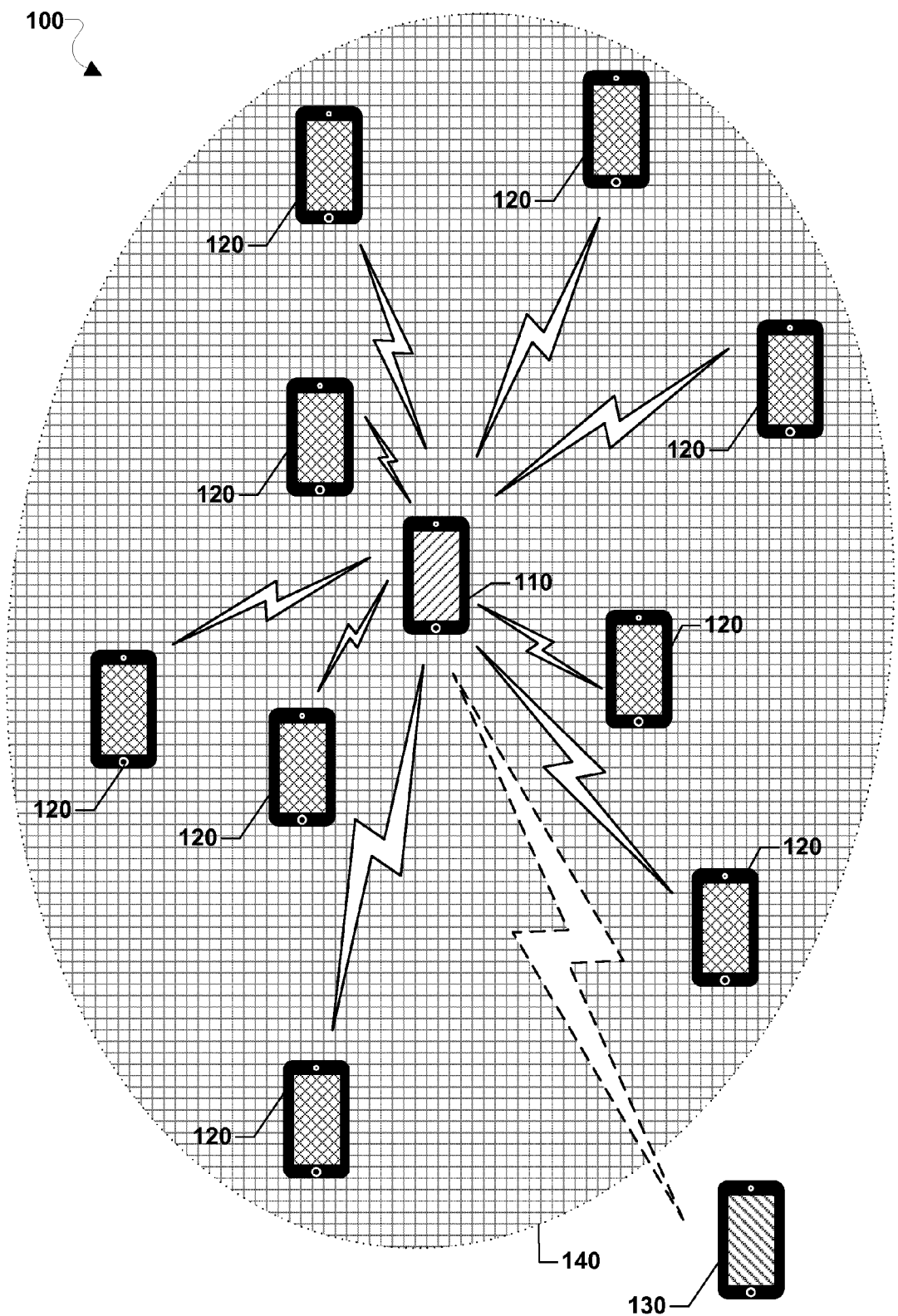
FIG. 1A is a diagram illustrating a Device-to-Device (D2D) communication environment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments facilitate target device selection for D2D communication that reduces battery drain based on a battery power level of a device, such as a targeting device. In various embodiments, a device selection algorithm for D2D communication may be activated when a battery power level of a device reaches a threshold value. In order to conserve battery power, a device selection algorithm, such as an algorithm being executed on a processor of a device, may establish a restricted communication range that is subject to a maximum transmit power level for the device. In some embodiments, the maximum transmit power level may be lower than the normal unrestricted transmit power level for the device. In some embodiments, the device may receive and retrieve expression and/or synchronization signals from other devices within its maximum range. Based on the received power level, signal strength (e.g. $P_{RX}$, RSSI, etc.) of target devices discovered in the maximum range, the device selection algorithm may decide to communicate with only those devices that are within an adjusted (e.g., reduced) range in order to conserve battery power. By conserving power, the device may advantageously operate longer on the remaining battery power. The adjusted range may be a function of overall battery power. In some embodiments, the adjusted range may be changed. For example, the adjusted range may be restricted or reduced compared to the maximum range as the battery charge state declines. When the battery charge state is restored, the adjusted range may be extended as a function of the battery charge state. For example, when the battery is fully charged, the adjusted range may be extended to the maximum range. Thus, as the battery charge level (e.g., remaining battery life) declines, the permitted communication range is reduced, and as the battery charge level increases (as the battery is charged) the permitted communication range expands up to the full range. Changes to the permitted communication range may be changed based on a threshold battery charge state. For example, the permitted communication range may be reduced when the battery charge state falls below a threshold. The permitted communication range may be extended when the battery charge state exceeds the threshold value.

In some embodiments, adjusting the permitted communication range may be accomplished by dynamically varying the receive power threshold as a function of the battery charge state or power level. In other words, as the remaining battery life is reduced, a receive power threshold may be established for target devices with which the device will be permitted to communicate may be raised (e.g., device selection). High received power levels may be associated with target devices that are closer to the device. Raising the receive power threshold for device selection, limits D2D communication to target devices that are close to the device and that therefore require lower transmit power for communication. To address this, a device may intelligently restrict D2D communication to target devices that are close to the device when the battery charge state of the device is low. Restricting D2D communication to close target devices reduces the uplink transmit power required for communications with the nearby target devices, thereby reducing the battery power consumption and extending the time that the UE can support D2D communications while operating on battery power.

As used herein the term "device to device," "D2D" may refer interchangeably to direct communications between devices in a communication environment. D2D communication may be communications between devices that may or may not require interaction with a network infrastructure. For example, in some systems, location information of a device must be constantly monitored and an application may be required to compare a device's location with available target services and target devices in the device's area (e.g., "ambient awareness") that are available through interaction with cloud based services. Ambient may disadvantageously consume battery power to maintain constant location awareness and target service and target device awareness. Location privacy may also be a consideration. In other examples, D2D communication may be provided using 3GPP LTE-Direct (LTE-D). In LTE-D, D2D communications may be conducted based on "proximal discovery," "proximate awareness," "proximity awareness," etc., where similarly configured devices (e.g., LTE-D devices) may discover each other when they are in proximity to each other, to a location, and so on. The devices may thereby engage in direct communication relieving the network of a degree of traffic load. In some embodiments, devices may communicate directly without intervention by network infrastructure operator, except to provide a platform for D2D communication (e.g., spectrum, applications, etc., operator-to-operator handoff). D2D communication may be further provided using WiFi Direct. In WiFi Direct, devices may connect directly with each other and communicate at WiFi data transfer rates without requiring a wireless access point. Wi-Fi Direct may enable devices from different manufacturers to connect in D2D communication, where only one of the Wi-Fi devices is compliant with Wi-Fi Direct. Other D2D communication platforms are possible.

As used herein, the term "range" "maximum range," "adjusted range" may all refer to an approximate distance over which radio signals may be transmitted, or received. The range of a transmitter may be dependent on various environmental conditions existing in the radio environment. Therefore, while the term "range" and its analogs are used herein in connection with distance, transmit power, and received power, the term range may not be susceptible to exact measurement. Therefore, range may refer to an average distance over which radio signals may be transmitted, or received by devices in the radio environment.

The various embodiments may be implemented using a variety of devices and device configurations in a radio environment, such as wireless devices. The devices may be smartphones, tablets, smart appliances, retail hot spots, etc. In the examples described herein, smartphones are used for illustrative purposes. However, other devices may be used in the various embodiments.

A D2D communication environment 100 is illustrated in FIG. 1A. In some embodiments, a device 110, which in the illustrated example may be a smartphone, may be positioned to establish D2D communication with one or more target devices 120. In some embodiments, the device 110 may have a communication range 140, which is a "maximum" range for the radio module of the device 110. The radio range 140 may be an average range (or distance) within which the device 110 can establish communication with the target devices 120. For example, the range 140 may represent the maximum transmit range over which signals can be transmitted to and received by the target devices 120. The range 140 may also represent a range from which radio signals may be received from the target devices 120. The ability of a transmitter to transmit a signal that may be received by a receiver is highly dependent on the conditions in the radio environment, such as the D2D communication environment 100. For a given transmit power level, factors affecting the range 140 may include the signal to noise ratio (SNR), and other factors. For example, when the environment 100 has a high noise level, the distance associated with the range 140 may be reduced for a given transmit power level. Further, depending on obstructions that exist within the environment 100, the distance of the range 140 may also be reduced. Other factors may also affect the distance associated with the range 140. Further, while the range 140 is shown as circular or ellipsoidal, the actual shape of the range 140 may be irregular depending on localized conditions and factors.

When a target device, such as target device 130 is "outside" the range 140, it may still be possible to communicate given a sufficient transmit power level, and the ability to receive signals from the target device 130. However, in some embodiments, the range 140 may refer to the distance associated with devices that can be discovered by the device 110. Therefore, the range 140 may alternatively or additionally refer to the distance at which target devices may be discovered. It may also be noted that, while the device 110 is referred to as a "device" and the devices 120 are referred to as "target devices," the device 110 may be a target for D2D communication with other devices as the embodiments may be implemented in any or all devices establishing D2D communication links with each other.

Figure 1B:
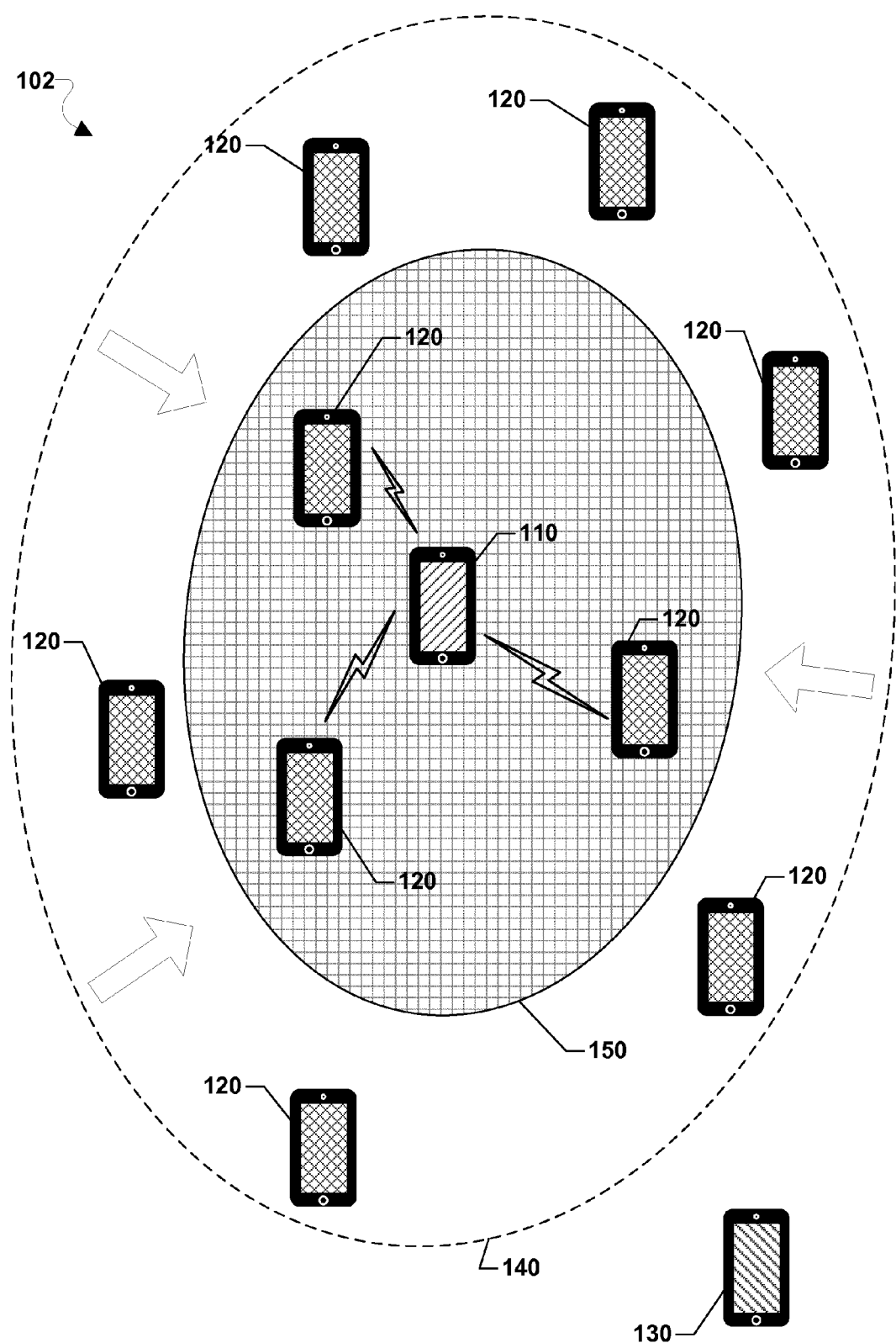
FIG. 1B is a diagram illustrating D2D communications environment using device selection in accordance with the various embodiments.

A D2D communication environment 102 is illustrated in FIG. 1B. The device 110 may perform device selection in some embodiments, to establish D2D communication with a restricted set of target devices 120. In some embodiments, the device 110 may perform device selection on the restricted set of the target devices 120 based on a restricted communication range 150. The restricted range 150 may be based on determining that the battery power level (e.g., charge state, remaining power, remaining life, etc.) is reduced. The range may be dynamically adjusted, such as restricted from the range 140 to the restricted range 150 or expanded from the restricted range 150 to the range 140. Additionally or alternatively, the range may be restricted to a more limited range than restricted range 150 or may be expanded beyond restricted range 150 but not to the full extent of range 140.

For example, in some embodiments, when a battery power level is determined by the device 110 to have been reduced from a maximum charge level, the device 110 may restrict device selection for D2D communication to ones of the target devices 120 that are within the restricted range 150. The restricted range 150 may correspond to a restricted transmit power level for the device 110 based on the reduced battery capacity. When the device 110 determines that the battery power level has been fully or partially restored, the restricted range 150 may be expanded toward the range 140 and additional ones of the target devices 120 may fall within range of the device 110 for device selection.

Figure 2A:
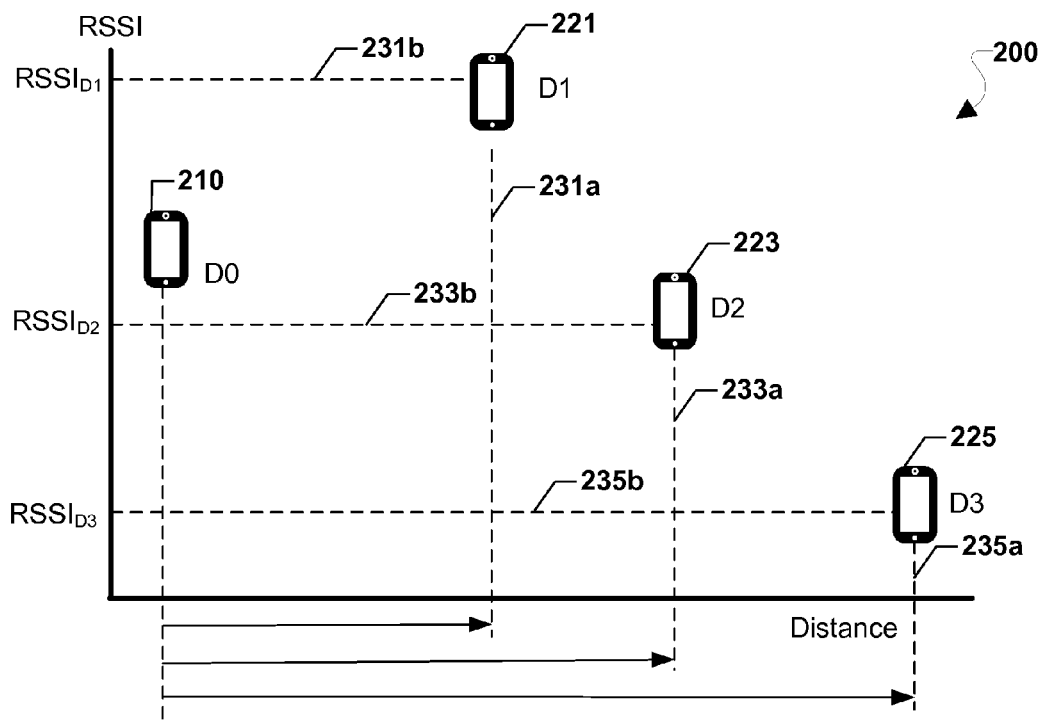
FIG. 2A is a graph illustrating received power as a function of distance in the various embodiments.

An example of device selection is graphically illustrated in graph 200 in FIG. 2A. A device D0 210 may be a device that is to engage in device selection for D2D communication with one or more of a device D1 221, a device D2 223, and a device D3 225. The device D0 210 may be at an arbitrary location or position. Further, the device D0 210 may be in motion. The device D2 221 may be at a distance 231a from the device D0 210, the device D3 223 may be at a distance 233a from the device D0 210, and the device D3 225 may be at a distance 235a from the device D0 210. The distances 231a, 233a, and 235a may be associated with range in that they may or may not be within the restricted range 150 or the unrestricted range 140. The device D1 221 may have a receive power level 231b (e.g. $P_{RX}$, RSSI, etc.), the device D2 223 may have a receive power level 233b, and the device D3 225 may have a receive power level 235b, when signals from the devices D1 231, D2 233, and D3 225 are received in a receiver of the device 210. As illustrated, the distances associated with the devices D1 221, D2 223 and D3 225 are inversely proportional to the respective received power levels 231b, 233b, and 235b. In other words, the device D1 221, being closest to the device D0 210, has a higher received power level 231b as compared to the received power level 233b of the device D2 223, and the received power level 235b of the device 225 (e.g., the distance 231a<the distance 233a<the distance 235a; the received power level 231b>the received power level 233b>the receive power level 235b).

Figure 2B:
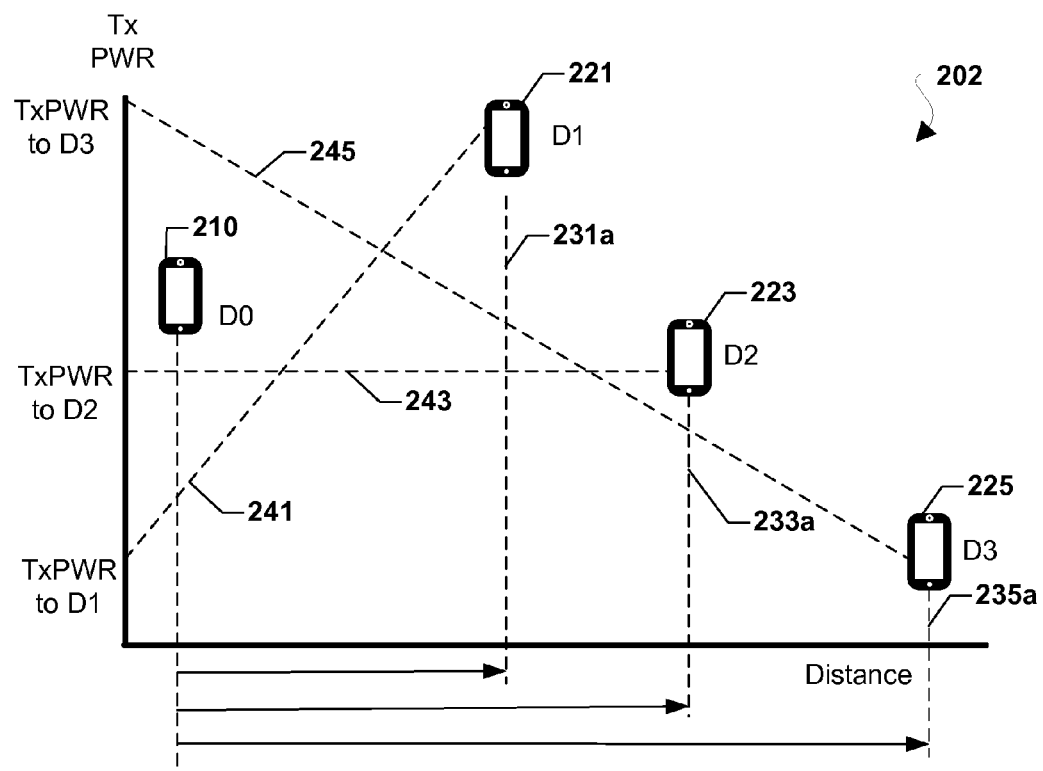
FIG. 2B is a graph illustrating required transmit power as a function of distance in the various embodiments.

Another example of device selection is graphically illustrated in graph 202 in FIG. 2B showing relative transmit power levels. In some embodiments, the device D0 210 may conduct D2D communication using respective transmit power levels that are proportional to the respective distances 231a, 233a and 235a. The respective transmit power levels that may be required by the device D0 210 may further be inversely proportional to the respective received power levels 231b, 233b, and 235b from the devices D1 221, D2 223, and D3 225. For example, when the device D0 210 selects the device D1 221 for D2D communication, the device D0 210 may transmit with a transmit power level 241. When the device D0 210 selects the device D2 223 for D2D communication, the device D0 210 may transmit with a transmit power level 243. When the device D0 210 selects the device D3 225, for D2D communication, the device D0 210 may transmit with a transmit power level 245. In the illustrated embodiment, the transmit power level 241 is less than the transmit power level 243, which is less than the transmit power level 245. In other words, it is apparent that the target devices closest to the device D0 210 require relatively lower transmit power levels, while the target devices farthest from the device D0 210 require relatively higher transmit power levels. Thus, in some embodiments, the device D0 210 may perform device selection in a restricted range and the corresponding transmit power levels may be reduced for communicating with target devices falling within the restricted range. In some embodiments, range restriction, and corresponding device selection, may be performed based on battery charge level.

Figure 2C:
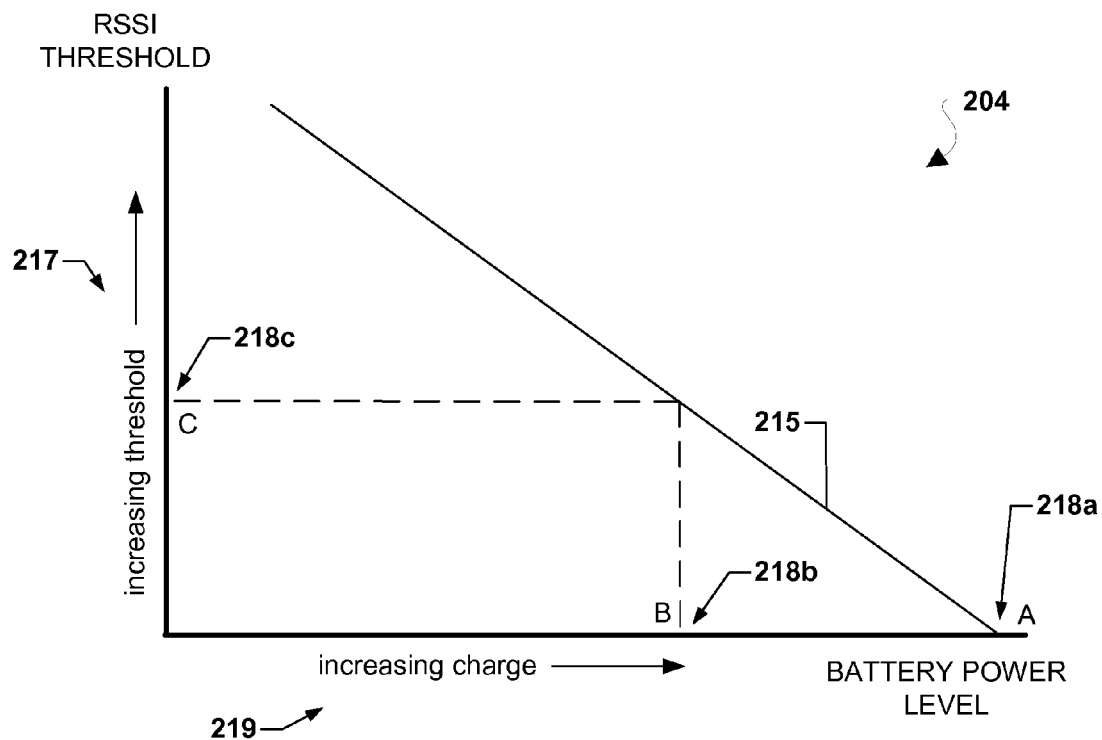
FIG. 2C is a graph illustrating a received power threshold as a function of a battery power level in the various embodiments.

Another example of device selection is graphically illustrated in graph 204 in FIG. 2C showing an example relationship 215 between threshold receive power levels and battery charge level. In some embodiments, the device D0 210 may determine a level of charge, power level, or other parameter of a battery. The determined battery power level will result in a position along an axis 219 of the graph 204. Based on the determined power level on the axis 219, a corresponding receive power level threshold may be determined along the relationship 215. For example, when the battery of the device D0 210 is fully charged, such as at power level A 218a, the receive power level may be set at a zero or nominal level. When the receive power threshold is set to a relatively low or nominal level, the effective range will be established at an unrestricted, or a maximum range. When the range is established at a maximum range, device selection may include any device in the unrestricted range. However, when the battery power level is determined to be lower than fully charged at the power level A 218a, such as at a power level B 218b, the received power level may be established at a receive power threshold C 218c. The received power threshold C 218c may result in an effective range that is restricted. Thus, the restricted range associated with the increased received power threshold C 218c may require device selection to be performed for devices that are closer to the device D0 210.

Figure 2D:
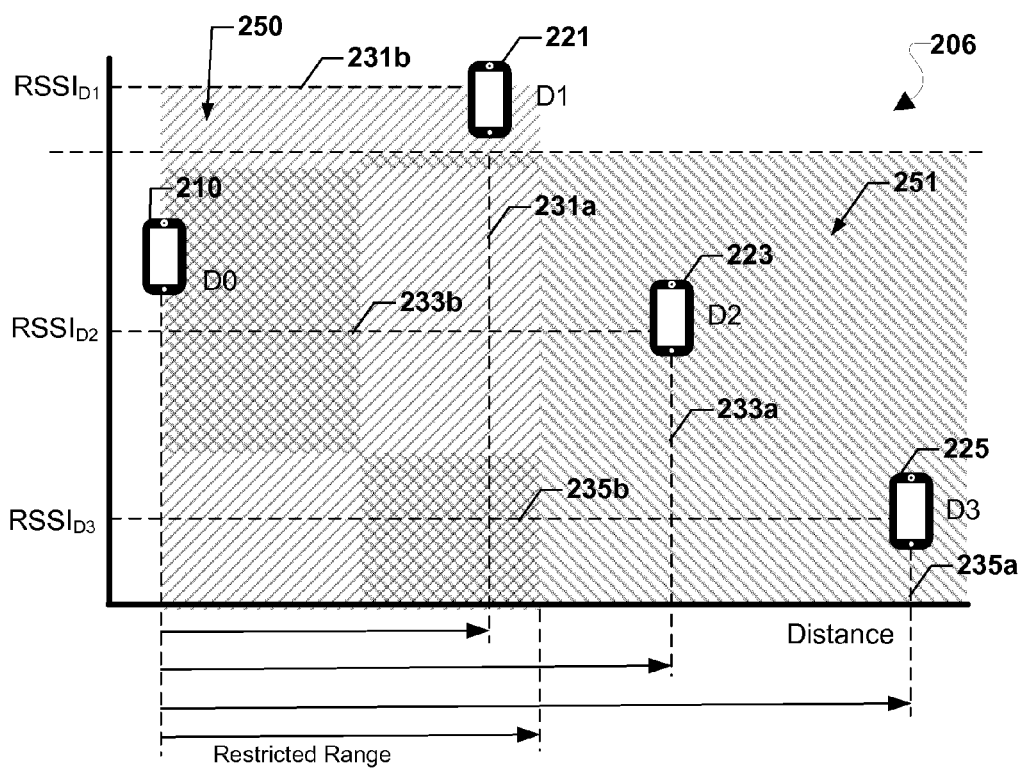
FIG. 2D is a graph illustrating device selection according to received power and distance in the various embodiments.

Another example of device selection is graphically illustrated in graph 206 in FIG. 2D showing device selection in a restricted range. In some embodiments, the device D0 210 may determine a battery power level as described above and may adjust a received power level threshold 251. By adjusting the received power level threshold 251, device selection is restricted for devices having a received power level that is below the received power level threshold 251. Adjusting the received power level threshold 251 may also establish a restricted range 250 for device selection. In the illustrated embodiment, only the device D1 221 has a sufficient receive power level, such as the received power level 231b (e.g., $RSSI_{D1}$) which is above the received power level threshold 251. The device D1 221 may be at the distance 231a from the device D0 210, and is therefore within the restricted range 250 for device selection.

Figure 3A:
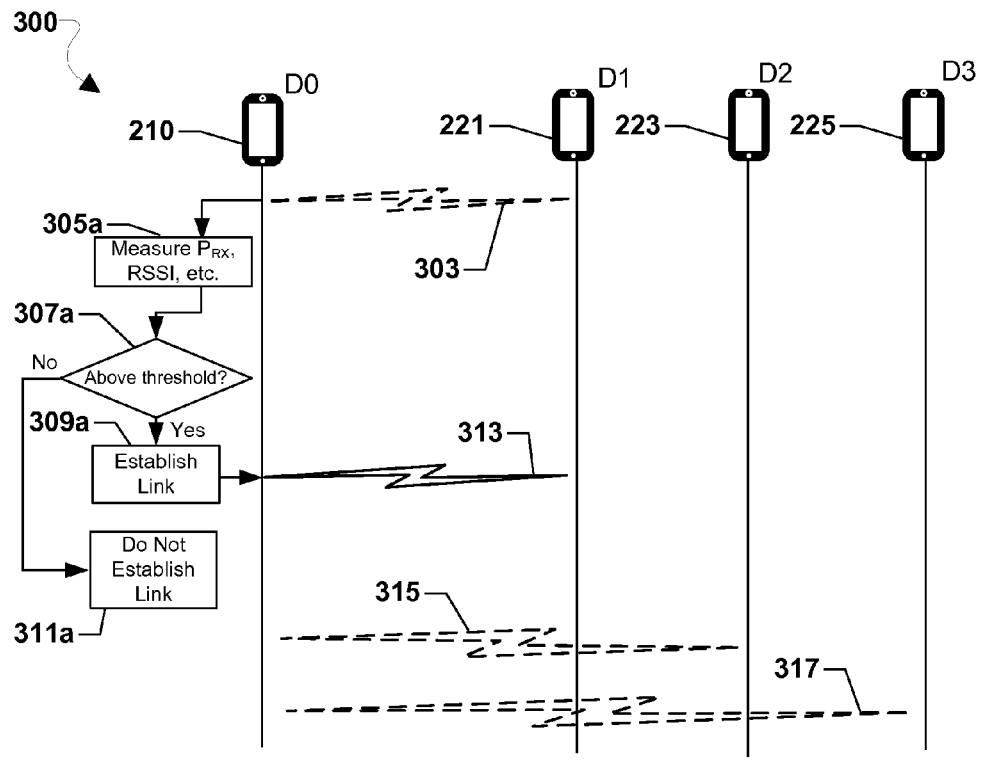
FIG. 3A is a connection flow diagram illustrating operations associated with device selection and connection in the various embodiments.

The device D0 210 may make device selections based on determinations regarding the received power levels in a connection flow environment 300 as illustrated in FIG. 3A. The device D0 210 may be in an environment where other devices are present such as the target devices D1 221, D2 223 and D3 225. The device D0 210 may, in an LTE-D environment, have "proximate awareness" or similar awareness of devices within its environment and may engage in proximate discovery of the devices within its environment. For example, in some embodiments, the target devices D1 221, D2 223 and D3 225 may be devices associated with other individuals in the area where the device D0 210 is located or is presently moving within. In other embodiments, the target devices D1 221, D2 223 and D3 225 may alternatively or additionally be devices associated with retail merchants, service providers, local/state/federal government services, police services, emergency services, or other businesses or offerors of goods and services. In still other embodiments, the target devices D1 221, D2 223 and D3 225 may be devices that can be controlled such as home automation devices, appliances, and so on.

In some embodiments, the devices D1 221, D2 223 and D3 225 may transmit signals, such as radio signals, to the device D0 210 that identify the device, the device capability, or other information that may be relevant to a decision to connect with the device. In LTE-D embodiments, the radio signals may be referred to as "expression" or "synchronization" signals. In LTE-D expressions may be private or public. In LTE-D, expressions are generally 128 bit data packages that contain information about the device sending the expression. Extensions to expressions are also possible and may contain additional information. Private expressions may be secure and sent only to certain enabled devices, such as LTE-D enabled devices that are subscribed to a particular merchant. Public expressions may be sent to any enabled devices that are configured to receive them. In other embodiments, the signals may have similar characteristics in that they may identify the target device and the capability of the target device to the device D0 210. However, in some embodiments, the signals received from the devices D1 221, D2 223 and D3 225 may be used to measure the received signal power. In alternative or additional embodiments, the device D0 210 may use the signals, expressions or other information to "filter" the target devices. For example, based on information in the signals, the device D0 210 may decide whether a connection is desired with the target device.

In some embodiments, the device D0 210 may be configured to receive any such signals from the target devices D1 221, D2 223 and D3 225 or other devices. For example, the device D0 210 may receive a signal 303 from the device D1 221. The device D0 210 may measure the received power level of the signal 303 in block 305a. For example, the device D0 210 may measure a received power level ($P_{RX}$), a received signal strength indicator (RSSI), or other measure of received signal power level, such as signal to noise ratio, and so on, for the signal 303. The device D0 210 may determine whether the received power level is above the received power level threshold in determination block 307a. In the illustrated embodiment, the device D0 210 may determine that the received power level of the signal 303 is above the received power level threshold (i.e., determination block 307a="Yes") and may establish a link 313 with the device D1 221 in block 309a. In the event the received power level is below the threshold (i.e., determination block 307a="No"), the device D0 210 may not establish a link in block 311a. The device D0 210 may receive additional signals such as a signal 315 from the device D2 223 and a signal 317 from the device D3 225.

Figure 3B:
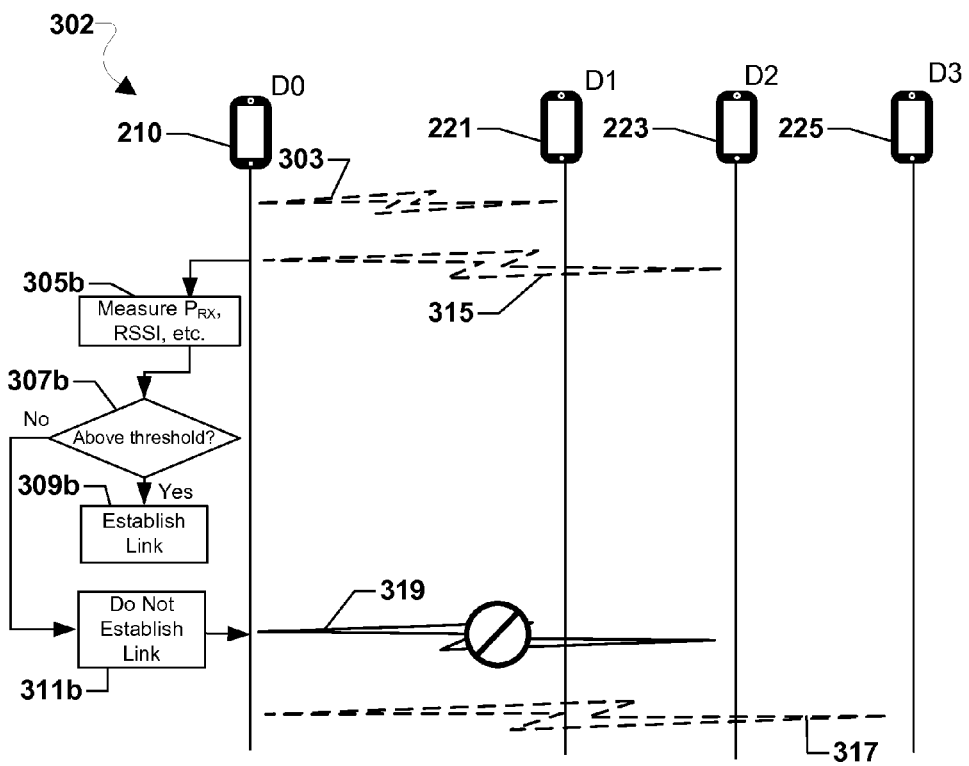
FIG. 3B is a connection flow diagram further illustrating operations associated with device selection and connection in the various embodiments.

In some embodiments, in a connection flow environment 302 as illustrated in FIG. 3B, the device D0 210 may receive the signal 315 from the device D2 223. The device D0 210 may measure the received power level of the signal 315 in block 305*b*. For example, the device D0 210 may measure a received power level ($P_{RX}$), a received signal strength indicator (RSSI), or other measure of received signal power level, such as signal to noise ratio, and so on, for the signal 315. The device D0 210 may determine whether the received power level is above the received power level threshold in determination block 307*b*. In the illustrated embodiment, the device D0 210 may determine that the received power level of the signal 315 is below (or not above) the received power level threshold (i.e., determination block 307*b*="No") and may refrain from establish a link 319 with the device D2 223 in block 311*b*. In the event the received power level is above the threshold (i.e., determination block 307*b*="Yes"), the device D0 210 may establish a link in block 309*b*.

Figure 4A:
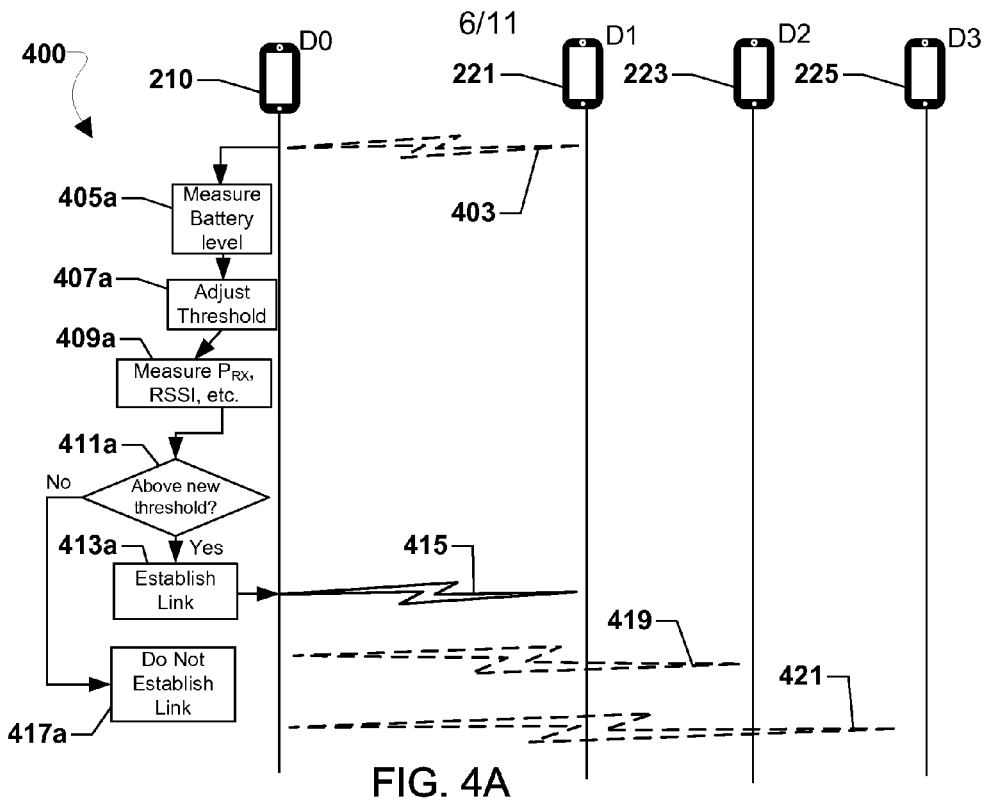
FIG. 4A is a connection flow diagram illustrating alternative or additional operations associated with device selection and connection in the various embodiments.

The device D0 210 may make device selections based on determinations regarding the received power levels based on an adjusted threshold in a connection flow environment 400 as illustrated in FIG. 4A. The device D0 210 may be in an environment where other devices are present such as the target devices D1 221, D2 223 and D3 225. The device D0 210 may receive a signal 403 from the device D1 221. The device D0 210 may measure a battery level in block 405*a*. For example, the device D0 210 may measure, obtain a measurement, or otherwise determine the charge state of the battery, which may include power level, remaining battery life, remaining useful transmit power, etc. The device D0 210 may adjust the received power threshold in block 407*a*. For example, the device D0 210 may adjust the threshold for device selection based on the measured or determined battery power level. In some embodiments, the device D0 210 may adjust the threshold to a higher received power level when the battery is in a reduced charge level state. In some embodiments, the device D0 210 may further adjust the threshold to a lower received power level when the battery is in an increased charge level state. For example, the increased or reduced charge level states may be based on a charge level state associated with a previous measurement of the battery charge level.

The device D0 210 may measure the received power level of the signal 403 in block 409*a*. For example, the device D0 210 may measure a received power level ($P_{RX}$), a received signal strength indicator (RSSI), or other measure of received signal power level, such as signal to noise ratio, and so on, for the signal 403. The device D0 210 may determine whether the received power level is above the received power level threshold in determination block 411*a*. In the illustrated embodiment, the device D0 210 may determine that the received power level of the signal 403 is above the received power level threshold (i.e., determination block 411*a*="Yes") and may establish a link 415 with the device D1 221 in block 413*a*. In the event the received power level is below (or not above) the threshold (i.e., determination block 411*a*="No"), the device D0 210 may not establish a link in block 417*a*. The device D0 210 may receive other signals, such as a signal 419 from the device D2 223 and a signal 421 from the device D3 225. Thus, in some embodiments, a restricted range for device selection may be adjusted when the charge state of the battery changes. While checking the battery charge level is shown in block 405*a* as being conducted generally in connection with receiving the signal 403, the device D0 210 may check the battery periodically or continuously regardless of whether a signal has been received.

Figure 4B:
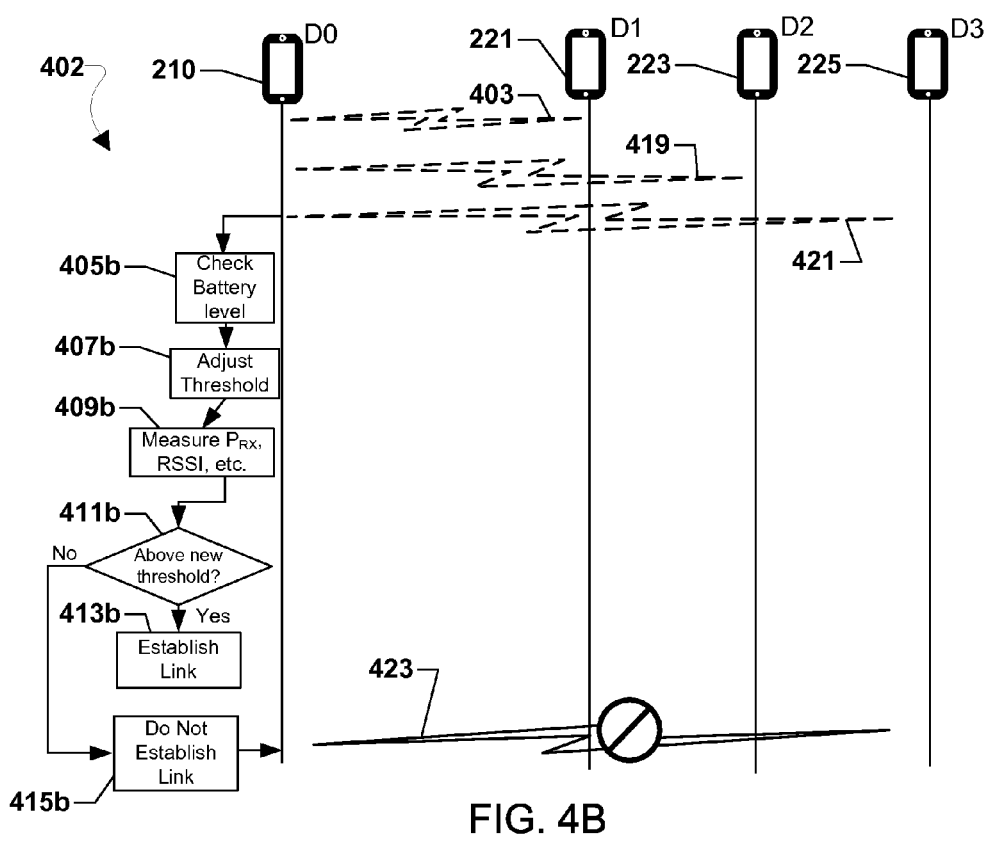
FIG. 4B is a connection flow diagram further illustrating alternative or additional operations associated with device selection and connection in the various embodiments.

The device D0 210 may make device selections based on determinations regarding the received power levels based on an adjusted threshold in a connection flow environment 402 as further illustrated in FIG. 4B. As in other examples, the device D0 210 may be in an environment where other devices are present such as the target devices D1 221, D2 223 and D3 225. The device D0 210 may receive the signal 421 from the device D3 225. The device D0 210 may measure a battery level in block 405*b*. For example, the device D0 210 may measure, obtain a measurement, or otherwise determine the charge state of the battery, which may include power level, remaining battery life, remaining useful transmit power, etc. The device D0 210 may adjust the received power threshold in block 407*a*. For example, the device D0 210 may adjust the threshold for device selection based on the measured or determined battery power level. In some embodiments, the device D0 210 may adjust the threshold to a higher received power level when the battery is in a reduced charge level state. In some embodiments, the device D0 210 may further adjust the threshold to a lower received power level when the battery is in an increased charge level state. For example, the increased or reduced charge level states may be based on a charge level state associated with a previous measurement of the battery charge level.

The device D0 210 may measure the received power level of the signal 421 in block 409*b*. For example, the device D0 210 may measure a received power level ($P_{RX}$), a received signal strength indicator (RSSI), or other measure of received signal power level, such as signal to noise ratio, and so on, for the signal 421. The device D0 210 may determine whether the received power level is above the received power level threshold in determination block 411*b*. In the illustrated embodiment, the device D0 210 may determine that the received power level of the signal 421 is below (or not above) the received power level threshold (i.e., determination block 411*b*="No") and may not establish a link 423 with the device D3 225 in block 415*b*. In the event the received power level is above the threshold (i.e., determination block 411*b*="Yes"), the device D0 210 may establish a link in block 413*b*. Thus, in some embodiments, a restricted range for device selection may be adjusted when the charge state of the battery changes, in which case target devices may be restricted from selection based on the restricted range and a received power level threshold.

An embodiment method 500 for device selection for a device, such as for target device selection for D2D communication for the device D0 210, is illustrated in FIG. 5. In block 501, the device processor and the device may power up. For example, the device processor may power up, initialize hardware and other start-up functions, and load various software applications.

In block 503, a processor of a radio module may power up. In some embodiments, the device processor may also conduct radio operations. In other embodiments, a separate radio module processor may be powered up. In some embodiments, such as where the device processor, the radio processor and other processors are configured as a system on chip (SoC) all devices may have access to at least a basic power supply. In other embodiments, the radio processor may be powered down until needed. In the present example, the radio processor may be required for operations. The destination may be a fixed street address, a set of GPS coordinates, a series of In block 505, the device processor may determine the power level of the battery. For example, the device processor may have a register where a value associated with battery information is stored. The battery information may be one or more of a variety of data related to the battery power level, such as a remaining charge level, a remaining power budget, a remaining battery life, a remaining transmit power level, and so on.

In block 507, the device processor may establish or adjust a received power threshold for device selection based on the battery power level determined in block 505. For example, in some embodiments, when device processor determines that the battery is fully charged, the device processor may lower the received power threshold to the lowest level. By setting the received power threshold to a relatively low level, the device processor may select any devices that are within a maximum range. In other words, the device processor may select any devices from which a signal or expression may be received. In other embodiments, the device processor may determine that the battery has a charge level that is reduced or significantly reduced from the fully charged power level. The device processor may raise the received power level threshold when the charge level is reduced such that device selection may be performed according to a restricted range. In other words, the device processor may select only those devices having signals or expression, having received power levels that are above the received power level threshold.

In block 509, the device processor may receive signals or expressions from potential D2D communication target devices within its environment. For example, the device processor may be in an environment where one or more target devices are present and that are capable of establishing D2D communication with the device processor. The signals or expressions may contain information about the services or capabilities offered by the target devices. In some embodiments, the device processor may be primarily interested in the signal level of the signals or expressions. In alternative or additional embodiments, the device processor may examine the contents of the signals or expression to determine whether D2D communications are desired with the target devices.

In block 511, the device processor may measure a received power level associated with the signals or expressions from the target devices. For example, the device processor may measure a received power level ($P_{RX}$), an RSSI, or other measurement such as signal to noise ratio. In some embodiments, the device processor may communicate with a radio processor to measure or obtain measurements of the received power levels. In other embodiments, the device processor may obtain measurement information from a storage register where the received power level information may be stored.

In determination block 513, the device processor may determine whether the received power level is above the threshold. In response to determining that the received power level is above the threshold (i.e., determination block 513="Yes"), the device processor may permit D2D communication with the target device in block 515, such as by adding the target device to a target device list or otherwise permit D2D communication with the target device.

In block 517, the device processor may establish D2D communication with the target device. The device processor may establish D2D communication at any time after the received power level is determined to be above the threshold in determination block 513. In some embodiments, the device processor may immediately establish D2D communication with the target device. In other embodiments, the target device may be added to a target device list and the device processor may establish D2D communications after other operations such as expression content filtering are performed.

In response to determining that the received power level is below (or not above) the threshold (i.e., determination block 513="No"), the device processor may inhibit D2D communication with the target device in block 519, such as by not adding the target device to a target device list or otherwise not permitting D2D communication with the target device. The device processor may proceed to block 509 and may continue to receive signals or expressions from other target devices and repeat various operations of embodiment method 500.

Figure 5A:
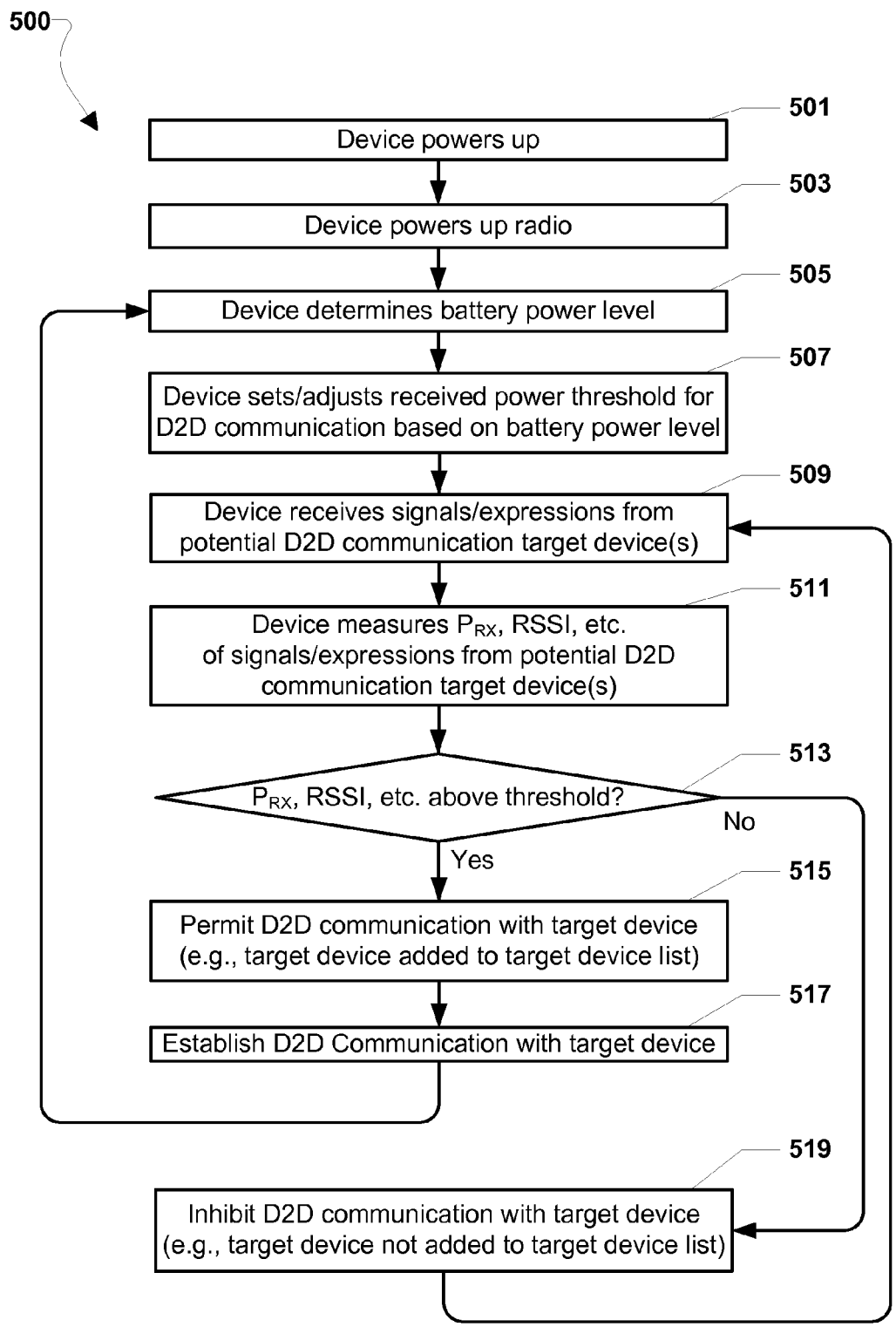
FIG. 5A is a process flow diagram illustrating an embodiment method having operations including device selection for establishing D2D communications.
Figure 5B:
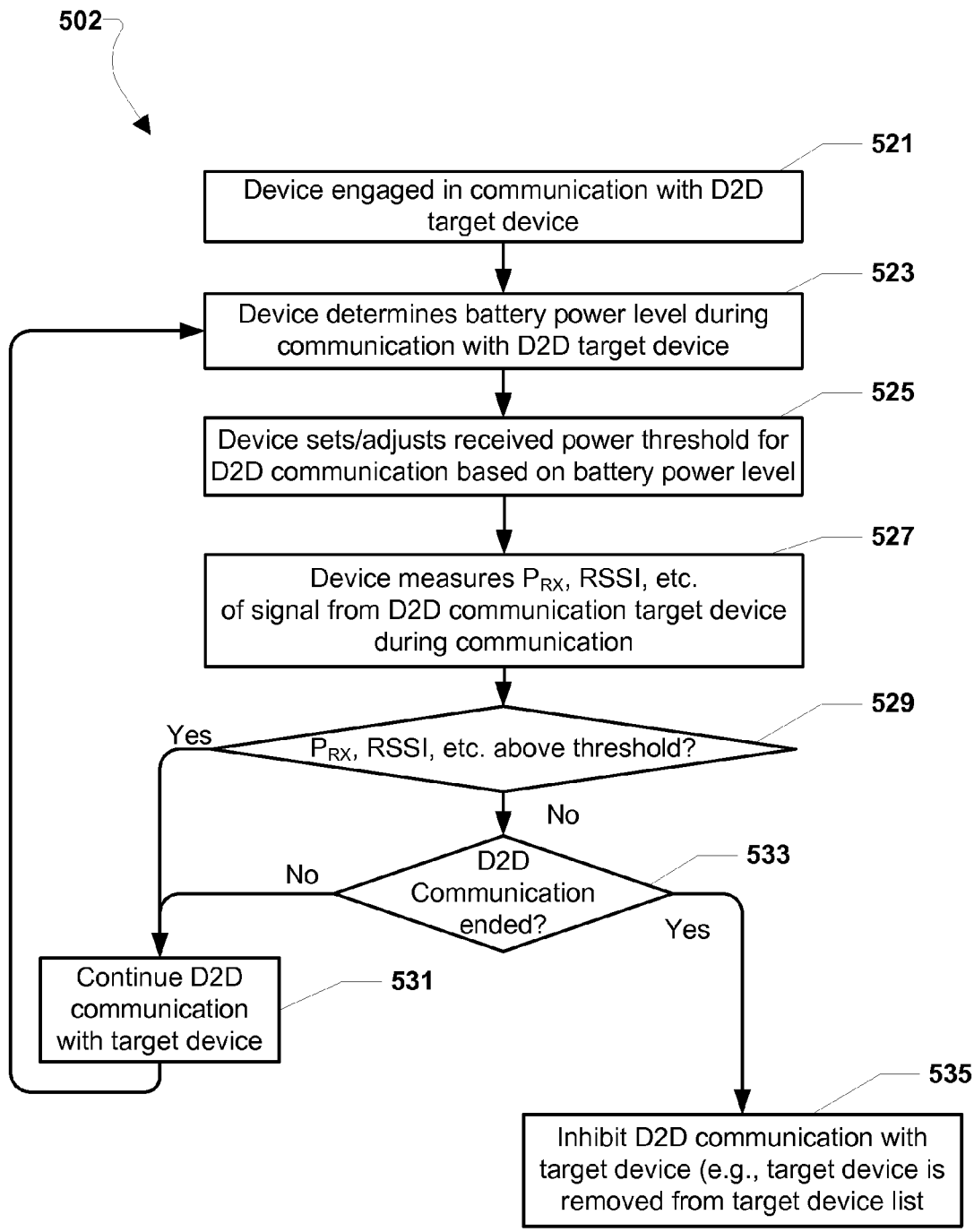
FIG. 5B is a process flow diagram illustrating an embodiment method having operations including device selection for an established D2D communication.

In an embodiment method 502, as illustrated in FIG. 5B, the device processor may perform operations associated with target device selection when engaged an existing D2D communication with the target device.

In block 521, the device processor may be engaged in D2D communications with a target device. In some embodiments, target devices that were previously within an established range based on a received power threshold may fall outside a restricted range as the received power level threshold is raised. For example, as the device processor engages in various operations that may reduce the battery charge level, the received power level threshold may require adjustment.

In block 523, the device processor may determine the power level of the battery during the established D2D communication. For example, the device processor may have a register where a value associated with battery information is stored. The battery information may be one or more of a variety of data related to the battery power level, such as a remaining charge level, a remaining power budget, a remaining battery life, a remaining transmit power level, and so on.

In block 525, the device processor may set or adjust the received power level threshold as described in block 507 of FIG. 5A. In some embodiments, the received power threshold may be set or adjusted notwithstanding the established D2D communication with the target device. In some embodiments, the received power level threshold may be set to a level (e.g., raised to a higher level) that would have excluded the target device from being selected by the device processor.

In block 527, the device processor may measure the received power level as described in block 511 of FIG. 5A. In some embodiments, the device processor may also measure the received power level associated with the target device with which the device processor is engaged in a D2D communication.

In determination block 529, the device processor may determine whether the received power level is above the threshold. In response to determining that the received power level is above the threshold (i.e., determination block 529="Yes"), the device processor may continue the D2D communication with the target device in block 531. In response to determining that the received power level is below (or not above) the threshold (i.e., determination block 529="No"), the device processor may proceed to determination block 533.

In determination block 533, the device processor may determine whether the established D2D communication has ended. In response to determining that the established D2D communication has not ended (i.e., determination block 533="No") the device processor may continue the D2D communication with the target device in block 531. The device processor may proceed to continue monitoring and may determine the battery power level in block 523. Various steps in the embodiment method 502 may be repeated.

In response to determining that the established D2D communication has ended (i.e., determination block 533="Yes") the device processor may inhibit D2D communication with the target device in block 535, such as inhibiting future communication while device selection restrictions remain in effect. Further, in some embodiments, the device processor may remove the target device from the target device list or otherwise prevent D2D communication with the target device. Because the device processor proceeds to determination block 533 based on the received power level being below the threshold, it will be apparent that the device processor may refrain from an abrupt termination of the D2D communication with the target device. However, in some embodiments, the device processor may provide a message or warning on a user interface, such as to a user of the device that continued D2D communication with the present target device may result in excessive battery power usage. The device processor may further provide a prompt on a user interface of the device, such as for a user of the device, to terminate the D2D communication.

Figure 6:
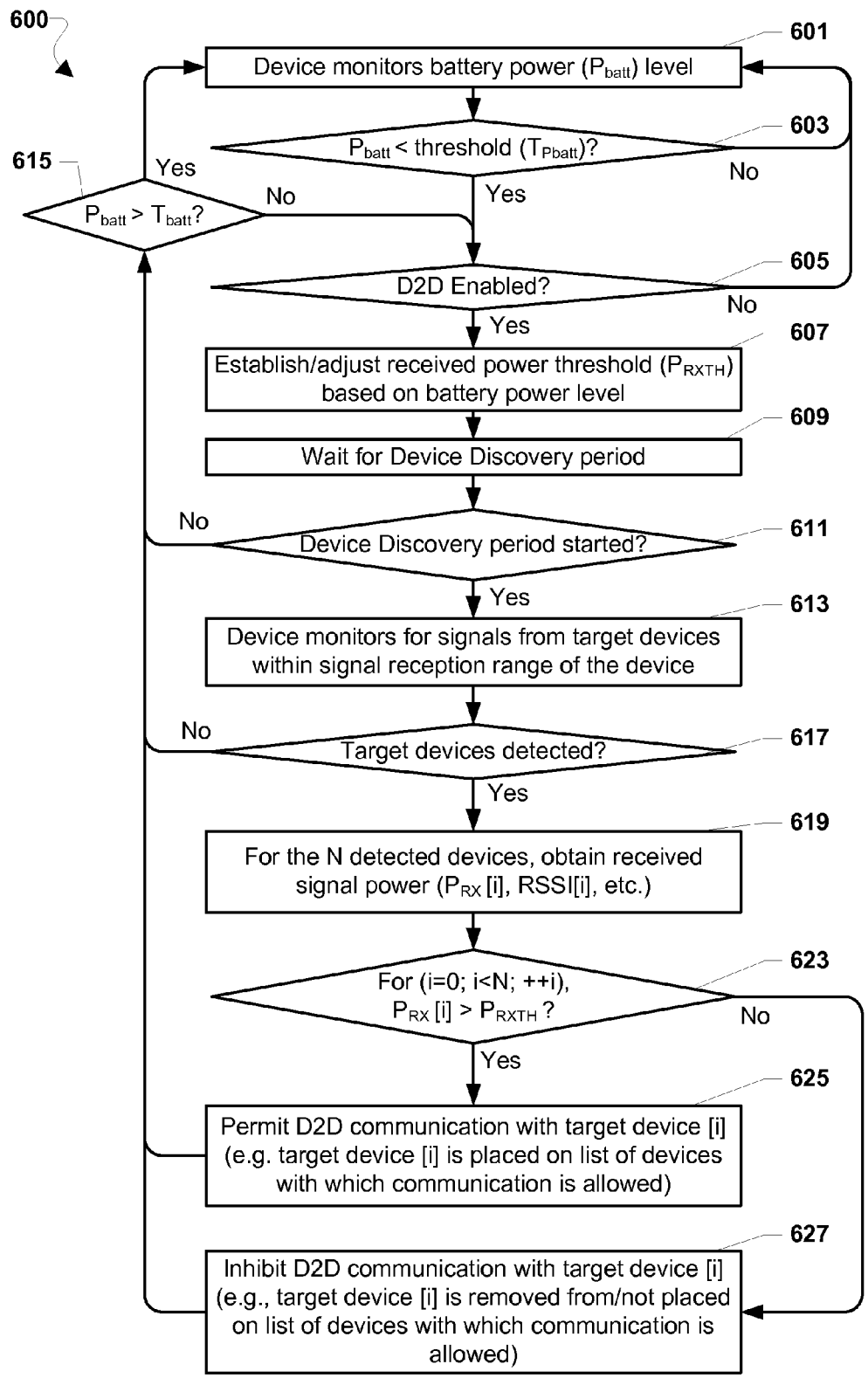
FIG. 6 is a process flow diagram further illustrating an embodiment method having operations including device selection.

Operations of embodiment methods, such as device selection based on range restriction, may be further described in connection with FIG. 6, which illustrates an embodiment method 600. In block 601, the device processor may monitor a value of a battery power level ($P_{batt}$). The device processor may monitor the value $P_{batt}$ in order to determine the power level of the battery. The device processor may also make additional determinations such as a projected batter life at the current and/or predicted usage levels and based on the current battery power levels. The device processor may monitor the battery level by obtaining direct or indirect information about the battery. For example, the device processor may have a register where a value associated with battery information is stored. The battery information may be one or more of a variety of information or data related to the battery power level, such as a remaining charge level, a remaining power budget, a remaining battery life, a remaining transmit power level, and so on. In some embodiments, the device processor may be configured to make direct measurements of the battery power level, such as by measuring the battery voltage using an analog input pin on the device processor, or other processor-based mechanism. In some embodiments, the device processor may establish a threshold level of the battery ($T_{Pbatt}$) such that when the value $P_{batt}$ exceeds the threshold $T_{Pbatt}$ device selection will be performed in a usual manner. However, device selection may be performed based on range restriction when the value $P_{batt}$ falls below the threshold $T_{Pbatt}$.

In determination block 603, the device processor may determine whether the value $P_{batt}$ is below the threshold $T_{Pbatt}$. In response to determining that the value of $P_{batt}$ is not below the threshold $T_{Pbatt}$ (i.e., determination block 603="No"), the device processor may continue to monitor the value $P_{batt}$ in block 601. In response to determining that the value of $P_{batt}$ is below the threshold $T_{Pbatt}$ (i.e., determination block 603="Yes"), the device processor may determine whether D2D communication is enabled for the device in determination block 605. In response to determining that D2D communication is not enabled for the device (i.e., determination block 605="No"), the device processor may continue to monitor the value $P_{batt}$ in block 601. In response to determining that D2D communication is enabled for the device (i.e., determination block 605="Yes"), the device processor may establish or adjust the received power threshold ($P_{RXTH}$) in block 607. In some embodiments, the device processor may allow unrestricted device selection for D2D communication within a range of battery power levels that are close to a fully charged battery power level. In other words, in some cases, until the battery power level $P_{batt}$ falls below a battery power level threshold $T_{Pbatt}$, the device processor may allow D2D communication with any target devices within an unrestricted range. In some embodiments, the device processor (and device) may be in a condition in which the device processor (and device) has first powered up after being fully charged. The device processor may establish the received power threshold $P_{RXTH}$ after the first reduction in the battery power level, such as a reduction that causes the value of $P_{batt}$ to fall below the threshold $T_{Pbatt}$. In other embodiments, the threshold $P_{RXTH}$ may be established based on a reduced battery power level. When the threshold $P_{RXTH}$ is established, the device processor may adjust the threshold $P_{RXTH}$, such as to lower the threshold $P_{RXTH}$ when the value of $P_{batt}$ falls further, or to raise the threshold $P_{RXTH}$ when the value of $P_{batt}$ rises, but is still below the threshold $T_{batt}$.

In block 605, the device processor may wait for a device discovery period. In some embodiments, the device processor may wait for a designated period when device discovery signals or expressions are sent by any target devices in an area of the device. In other embodiments, the device processor may receive device discovery signals or expressions from target devices asynchronously. Thus, in some embodiments, the device discovery period may be periodic or asynchronous.

In determination block 611, the device processor may determine whether the device discovery period has started. In response to determining that the device discovery period has not started (i.e., determination block 611="No"), the device processor may determine whether the value $P_{batt}$ is greater than the threshold $T_{batt}$ in determination block 615. For example, the device may have been connected to a charging device. In response to determining that the value $P_{batt}$ is greater than the threshold $T_{batt}$ (i.e., determination block 615="Yes"), the device processor may return to block 601 and continue to monitor batter power levels. In response to determining that the value $P_{batt}$ is not greater than the threshold $T_{batt}$ (i.e., determination block 615="No"), the device processor may continue to determine whether D2D communication is enabled in determination block 605.

In response to determining that the device discovery period has started (i.e., determination block 611="Yes"), the device processor may monitor signals or expressions from target devices in block 613. In some embodiments, the device processor may receive signals or expressions from many target devices, such as those close to the device or those far away from the device. In some embodiments, the ability to receive signals or expressions by the device processor is generally not restricted in any way, such as for the purpose of device selection. Thus, even when the range is restricted, the device processor may receive signals and expressions from target devices outside the restricted range in order to determine whether the target devices from which the signals and expressions are received may be selected for D2D communication.

In determination block 617, the device processor may determine whether any target devices have been detected. In some embodiments, detection of target devices may be based on receiving signals and expression from target devices. In response to determining that target devices are not detected (i.e., determination block 617="No"), the device processor may return to determination block 615. In response to determining that target devices are detected (i.e., determination block 617="Yes"), the device processor may obtain the received signal power of the N devices that were detected in block 617. In some embodiments, the device processor may determine the received signal power (e.g., $P_{RX}[i]$, RSSI[i], etc.), such as when the target devices are detected based on receiving signals or expressions. In some embodiments, the device processor may obtain the received power levels by measurement. In other embodiments, the device processor may obtain the received power levels based on stored information, such as information in storage registers of the device. In some embodiments, the device processor may obtain the received signal power levels from each of the N detected target devices. The device processor may measure and store the received power levels. In other embodiments, the device processor may filter the target devices based on information received in the signals or expressions from the devices. Therefore, the device processor may not obtain the received power information for the filtered devices, or may obtain, but not use the receive power levels for the filtered devices.

In determination block 623, the device processor may determine a device N[i], where i may be incremented from 0 to N, whether a respective received power level $P_{RX}[i]$ (or RSSI[i], etc.), is greater than the received power level threshold $P_{RXTH}$. In response to determining that the respective received power level $P_{RX}[i]$ is greater than the received power level threshold $P_{RXTH}$ (i.e., determination block 623="Yes"), the device processor may permit or allow D2D communication with the target device[i], such as by adding the respective target device[i] to a list of target devices with which D2D communication is permitted or allowed. In response to determining that the respective received power level $P_{RX}[i]$ is not greater than the received power level threshold $P_{RXTH}$ (i.e., determination block 623="No"), the device processor may inhibit D2D communications in block 627. The device processor may inhibit D2D communication by not permitting or not allowing D2D communication with the target device[i], such as by not adding the respective target device[i] to a list of target devices with which D2D communication is permitted or allowed or removing the respective target device[i] from the list of target devices with which D2D communication is permitted or allowed.

When D2D communication is permitted or not permitted for all of the target devices[i], such as when the devices have been added or removed from the target device list, the device processor may return to determination block 615, and some or all of the various operations of embodiment method 600 may be repeated.

Figure 7:
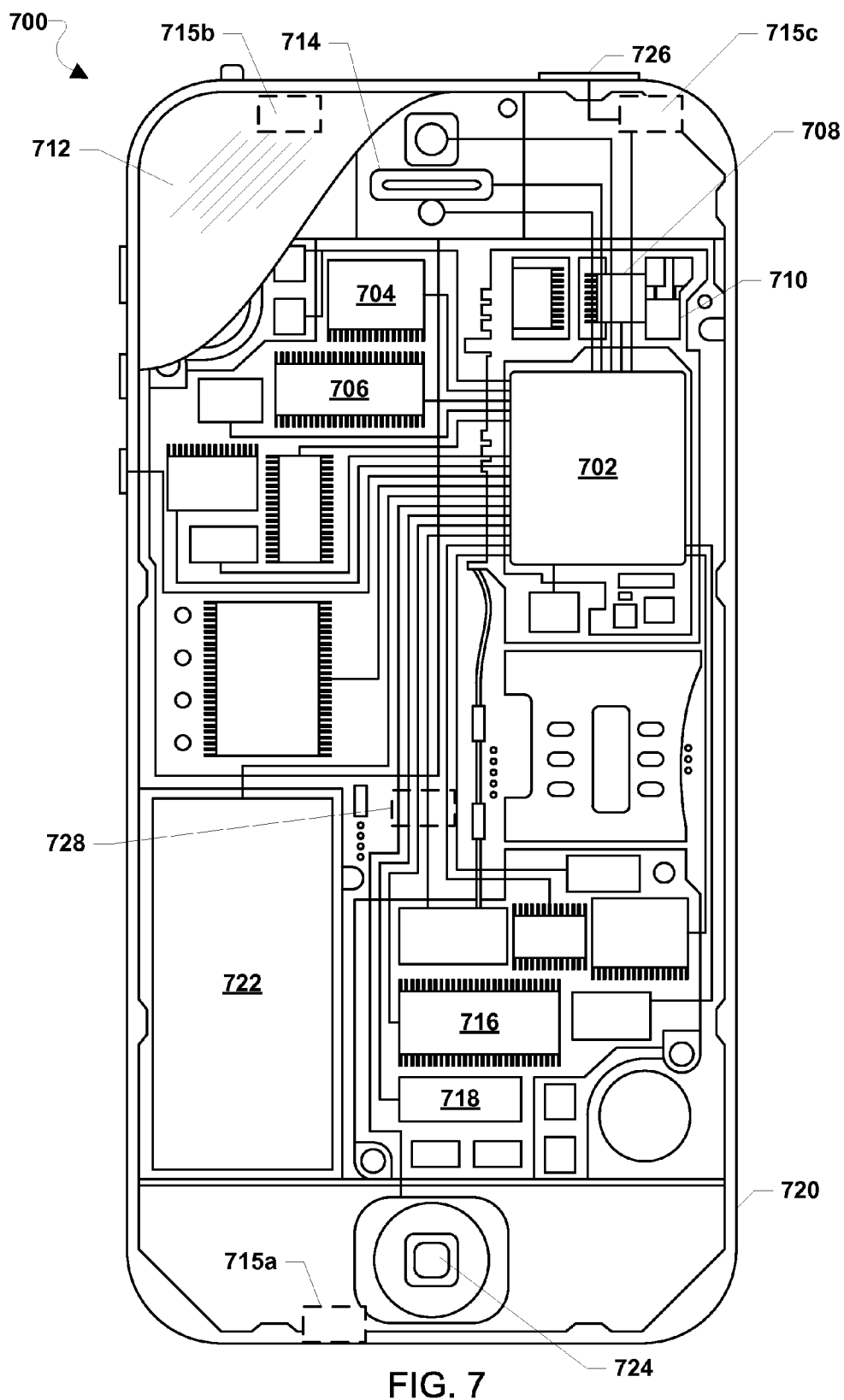
FIG. 7 is a component diagram of an example device in the form of mobile computing device suitable for use with the various embodiments.

The various aspects, such as performing device selection for D2D communication as illustrated in at least FIG. 1B, 2D, FIG. 3A-3B, FIG. 4A-4B, and FIG. 5A-5B, may be implemented in any of a variety of mobile computing devices (e.g., smartphones, tablets, etc.) an example of which is illustrated in FIG. 7. The mobile computing device 700 may include a processor 702 coupled the various systems of the computing device 700 for communication with and control thereof. For example, the processor 702 may be coupled to a touch screen controller 704, radio communication elements, speakers and microphones, and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the computing device 700 may also be coupled to an external memory, such as an external hard drive.

The touch screen controller 704 and the processor 702 may also be coupled to a touch screen panel 712, such as a resistive-sensing touch screen, capacitive-sensing touch screen, infrared sensing touch screen, etc. Additionally, the display of the mobile computing device 700 need not have touch screen capability. The mobile computing device 700 may have one or more radio signal transceivers 708 (e.g., Peanut, Bluetooth, Bluetooth LE, Zigbee, Wi-Fi, RF radio, etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

In some embodiments, the mobile computing device 700 may include microphones 715. For example, the mobile computing device may have a conventional microphone 715a for receiving voice or other audio frequency energy from a user during a call. The mobile computing device 700 may further be configured with additional microphones 715b and 715c, which may be configured to receive audio including ultrasound signals. Alternatively, all microphones 715a, 715b, and 715c may be configured to receive ultrasound signals. The microphones 715 may be piezo-electric transducers, or other conventional microphone elements. Because more than one microphone 715 may be used, relative location information may be received in connection with a received ultrasound signal through various triangulation methods. At least two microphones 715 configured to receive ultrasound signals may be used to generate position information for an emitter of ultrasound energy.

The mobile computing device 700 may also include speakers 714 for providing audio outputs. The mobile computing device 700 may also include a housing 720, constructed of a plastic, metal, or a combination of materials, for containing all or some of the components discussed herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

In some embodiments, the mobile computing device 700 may further include an accelerometer 728, which senses movement, vibration, and other aspects of the device through the ability to detect multi-directional values of and changes in acceleration. In the various embodiments, the accelerometer 728 may be used to determine the x, y, and z positions of the mobile computing device 700. Using the information from the accelerometer, a pointing direction of the mobile computing device 700 may be detected.

Figure 8:
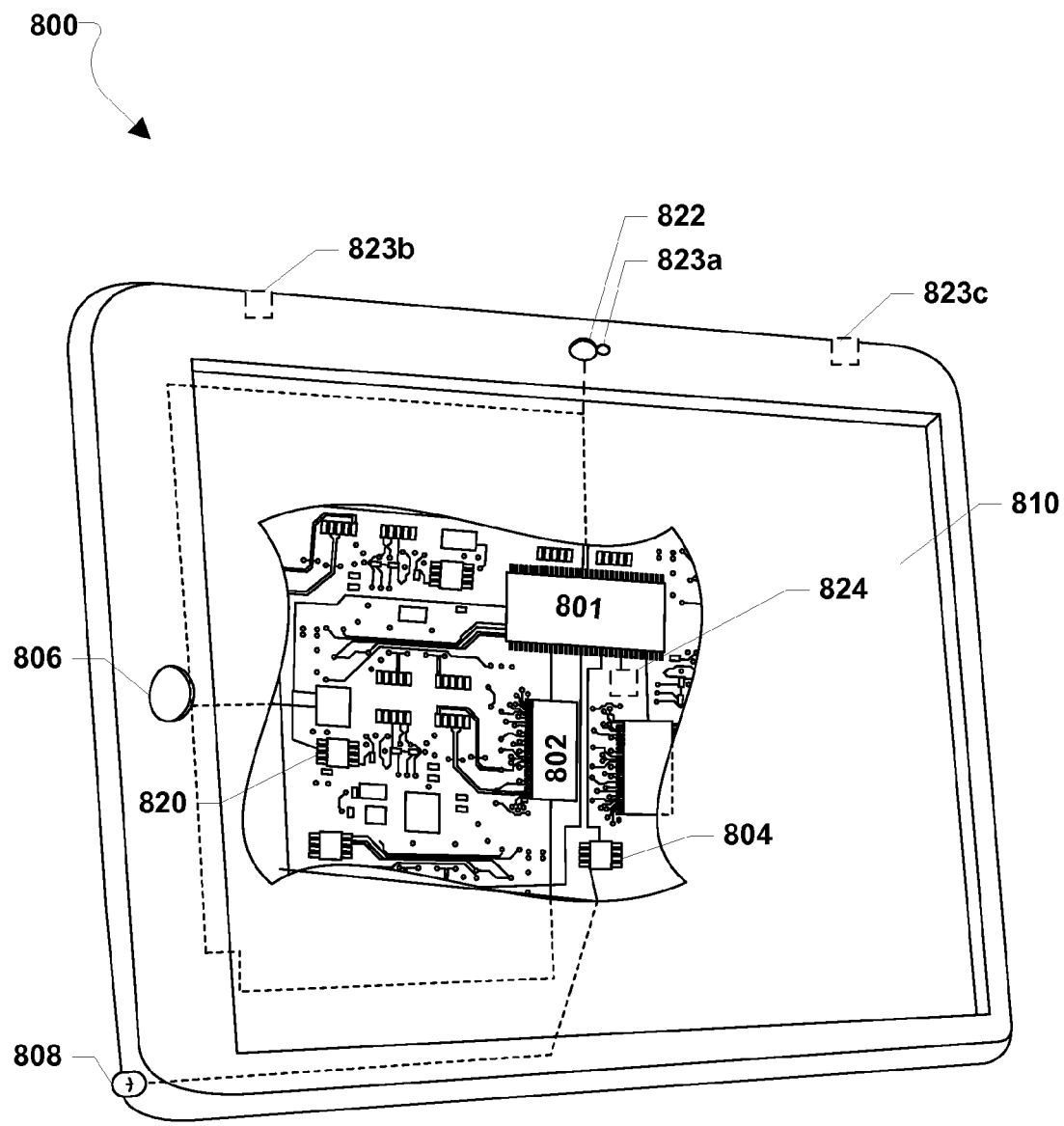
FIG. 8 is a component diagram of an example device in the form of tablet computer suitable for use with the various embodiments.

The various embodiments, such as for performing device selection for D2D communication as illustrated in at least FIG. 1B, 2D, FIG. 3A-3B, FIG. 4A-4B, and FIG. 5A-5B, may be implemented in any of a variety of tablet mobile computing devices, an example of which is illustrated in FIG. 8. For example, a tablet mobile computing device 800 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touch screen display 810, such as a resistive-sensing touch screen, capacitive-sensing touch screen infrared sensing touch screen, etc. The tablet mobile computing device 800 may have one or more radio signal transceivers 804 (e.g., Peanut, Bluetooth, Zigbee, WiFi, RF radio) and antennas 808 for sending and receiving wireless signals as described herein. The transceivers 804 and antennas 808 may be used with the above-mentioned circuitry to implement the various wireless transmission protocol stacks and interfaces. The tablet mobile computing device 800 may include a cellular network wireless modem chip 820 that enables communication via a cellular network. The tablet mobile computing device 800 may also include a physical button 806 for receiving user inputs. The tablet mobile computing device 800 may also include various sensors coupled to the processor 801, such as a camera 822, a microphone or microphones 823, and an accelerometer 824.

For example, the tablet mobile computing device 800 may have a conventional microphone 823a for receiving voice or other audio frequency energy from a user during a call or other voice frequency activity. The tablet mobile computing device 800 may further be configured with additional microphones 823b and 823c, which may be configured to receive audio including ultrasound signals. Alternatively, all microphones 823a, 823b, and 823c may be configured to receive ultrasound signals. The microphones 823 may be piezo-electric transducers, or other conventional microphone elements. Because more than one microphone 823 may be used, relative location information may be received in connection with a received ultrasound signal through various methods such as time of flight measurement, triangulation, and similar methods. At least two microphones 823 that are configured to receive ultrasound signals may be used to generate position information for an emitter of ultrasound energy.

Also in some embodiments, the tablet mobile computing device 800 may further include an accelerometer 824 that senses movement, vibration, and other aspects of the tablet mobile computing device 800 through the ability to detect multi-directional values of and changes in acceleration. In the various embodiments, the accelerometer 824 may be used to determine the x, y, and z positions of the tablet mobile computing device 800. Using the information from the accelerometer 824, a pointing direction of the tablet mobile computing device 800 may be detected.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for selecting target devices for device-to-device (D2D) communications, comprising:
    determining, by a processor of a mobile device, whether a battery power level of the mobile device is below a threshold battery power level;
    establishing, by the processor of the mobile device, a received power level threshold for receiving D2D communication signals from the target devices in response to determining that the battery power level of the mobile device is below the threshold battery power level; and
    limiting D2D communications to those target devices whose received signal power level exceeds the established received power level threshold.

2. The method of claim 1, wherein determining, by a processor of the mobile device, whether the battery power level of the mobile device is below the threshold battery power level comprises:
   establishing the threshold battery power level based on a transmit power level that is sufficient to permit D2D communications within a communication range;
   determining the battery power level; and
   comparing the battery power level to the established threshold battery power level.

3. The method of claim 2, wherein establishing, by the processor of the mobile device, the received power level threshold, in response to determining that the battery power level of the mobile device is below the threshold battery power level comprises:
   determining an adjusted transmit power level that is sufficient to permit D2D communications within a restricted range; and
   establishing the received power level threshold to permit D2D communications with target devices within the restricted range.

4. The method of claim 1, wherein limiting D2D communications to those target devices for which the received signal power level exceeds the established received power level threshold comprises:
   determining, by the processor of the mobile device, whether a received power level of a signal from a target device for D2D communications is above the received power level threshold; and
   permitting, by the processor of the mobile device, D2D communications with the target device in response to determining that the received power level from the target device is above the received power level threshold.

5. The method of claim 4, further comprising:
   inhibiting, by the processor of the mobile device, D2D communications with the target device in response to determining that the received power level from the target device is not above the received power level threshold.

6. The method of claim 4, wherein determining, by the processor of the mobile device, whether the received power level of the signal from the target device for D2D communications is above the received power level threshold comprises:
   obtaining one or more of: a received power ($P_{RX}$) level, a received signal strength indicator (RSSI), and a signal to noise ratio (SNR) of the received signal from the target device; and
   comparing the obtained one or more of the $P_{RX}$ level, the RSSI, and the SNR with the received power level threshold.

7. The method of claim 4, wherein permitting, by the processor of the mobile device, D2D communications with target devices in response to determining that the received power level from target devices is above the received power level threshold comprises adding, by the processor of the mobile device, target devices to a list of target devices with which D2D communication is permitted in response to the received power level of the received signal from target devices being above the received power level threshold.

8. The method of claim 5, wherein inhibiting, by the processor of the mobile device, D2D communications with the target device in response to determining that the received power level from the target device is not above the received power level threshold comprises one or more of:
   removing target devices from a list of target devices with which D2D communication is permitted; and
   not adding target devices to the list of target devices with which D2D communication is permitted.

9. A mobile device configured to establish device-to-device (D2D) communications with target devices, comprising:
   a radio module;
   a memory; and
   a processor coupled to the memory and the radio module, the processor configured with processor-executable instructions to perform operations comprising:
      determining whether a battery power level of the mobile device is below a threshold battery power level;
      establishing a received power level threshold for receiving D2D communication signals from target devices in response to determining that the battery power level of the mobile device is below the threshold battery power level; and
      limiting D2D communications to those target devices whose received signal power level exceeds the established received power level threshold.

10. The mobile device of claim 9, wherein the processor is configured with processor-executable instructions to perform operations such that determining whether the battery power level of the mobile device is below the threshold battery power level comprises:
   establishing the threshold battery power level based on a transmit power level that is sufficient to permit D2D communications within a communication range;
   determining the battery power level; and
   comparing the battery power level to the established threshold battery power level.

11. The mobile device of claim 10, wherein the processor is configured with processor-executable instructions to perform operations such that establishing the received power level threshold comprises:
   determining an adjusted transmit power level that is sufficient to permit D2D communications within a restricted range; and
   establishing the received power level threshold to permit D2D communications with target devices within the restricted range.

12. The mobile device of claim 9, wherein the processor is configured with processor-executable instructions to perform operations such that limiting D2D communications with target devices to those target devices for which the received signal power level exceeds the established received power level threshold comprises:
   determining whether a received power level of a signal from the target device for D2D communication is above the received power level threshold; and
   permitting D2D communications with the target device in response to determining that the received power level from target devices is above the received power level threshold.

13. The mobile device of claim 12, wherein the processor is configured with processor-executable instructions to perform operations further comprising:
   inhibiting the D2D communication with the target device in response to determining that the received power level from target devices is not above the received power level threshold.

14. The mobile device of claim 12, wherein the processor is configured with processor-executable instructions to perform operations such that determining whether the received power level of the signal from target devices for D2D communication is above the received power level threshold comprises:

obtaining one or more of: a received power ($P_{RX}$) level, a received signal strength indicator (RSSI), and a signal to noise ratio (SNR) of the received signal from target devices; and comparing the obtained one or more of the $P_{RX}$ level, the RSSI, and the SNR with the received power level threshold.

15. The mobile device of claim 12, wherein the processor is configured with processor-executable instructions to perform operations such that permitting D2D communications with target devices in response to determining that the received power level from target devices is above the received power level threshold comprises adding target devices to a list of target devices with which D2D communications is permitted in response to the received power level of the received signal from target devices being above the received power level threshold.

16. The mobile device of claim 13, wherein the processor is configured with processor-executable instructions to perform operations such that inhibiting D2D communications with the target device in response to determining that the received power level from the target device is not above the received power level threshold comprises one or more of:

removing target devices from a list of target devices with which D2D communications is permitted; and not adding target devices to the list of target devices with which D2D communications is permitted.

17. A mobile device configured to establish device-to-device (D2D) communications with target devices, comprising:

means for determining whether a battery power level of the mobile device is below a threshold battery power level;

means for establishing a received power level threshold for receiving D2D communication signals from the target devices in response to determining that the battery power level of the mobile device is below the threshold battery power level; and means for limiting D2D communications with target devices to those target devices for which a received signal power level exceeds the established received power level threshold.

18. The mobile device of claim 17, wherein means for determining whether the battery power level of the mobile device is below the threshold battery power level comprises:

means for establishing the threshold battery power level based on a transmit power level that is sufficient to permit D2D communications within a communication range;

means for determining the battery power level; and means for comparing the battery power level to the established threshold battery power level.

19. The mobile device of claim 18, wherein means for establishing the received power level threshold comprises:

means for determining an adjusted transmit power level that is sufficient to permit D2D communications within a restricted range; and means for establishing the received power level threshold to permit communication with target devices within the restricted range.

20. The mobile device of claim 17, wherein means for limiting D2D communications with target devices to those target devices for which the received signal power level exceeds the established received power level threshold comprises:

means for determining whether a received power level of a signal from a target device for D2D communications is above the received power level threshold; and means for permitting D2D communications with the target device in response to determining that the received power level from the target device is above the received power level threshold.

21. The mobile device of claim 20, wherein means for determining whether the received power level of the signal from target devices for D2D communications is above the received power level threshold comprises:

means for obtaining one or more of: a received power ($P_{RX}$) level, a received signal strength indicator (RSSI), and a signal to noise ratio (SNR) of the received signal from the target device; and means for comparing the obtained one or more of the $P_{RX}$ level, the RSSI, and the SNR with the received power level threshold.

22. The mobile device of claim 20, wherein means for permitting D2D communications with target devices in response to determining that the received power level from target devices is above the received power level threshold comprises means for adding target devices to a list of target devices with which D2D communication is permitted in response to the received power level of received signals from the target devices being above the received power level threshold.

23. A non-transitory processor-readable medium with processor-executable instructions stored thereon, the processor-executable instructions configured to cause a processor of a mobile device to perform operations comprising:

determining whether a battery power level of the mobile device is below a threshold battery power level;

establishing a received power level threshold for receiving D2D communication signals from target devices in response to determining that the battery power level of the mobile device is below the threshold battery power level; and limiting D2D communications with target devices to those target devices whose received signal power levels exceed the established received power level threshold.

24. The non-transitory processor-readable medium of claim 23, wherein the stored processor-executable instructions are configured to cause the processor to perform operations such that determining whether the battery power level of the mobile device is below the threshold battery power level comprises:

establishing the threshold battery power level based on a transmit power level that is sufficient to permit D2D communication within a communication range;

determining the battery power level; and comparing the battery power level to the established threshold battery power level.

25. The non-transitory processor-readable medium of claim 24, wherein the stored processor-executable instructions are configured to cause the processor to perform operations such that establishing the received power level threshold in response to determining that the battery power level of the mobile device is below the threshold battery power level comprises:

determining an adjusted transmit power level that is sufficient to permit D2D communication within a restricted range; and establishing the received power level threshold to permit communication with target devices within the restricted range.

26. The non-transitory processor-readable medium of claim 23, wherein the stored processor-executable instructions are configured to cause the processor to perform operations such that limiting D2D communications with target devices to those target devices for which the received signal power level exceeds the established received power level threshold comprises:

determining whether a received power level of a signal from a target device for D2D communication is above the received power level threshold; and permitting D2D communications with the target device in response to determining that the received power level from the target device is above the received power level threshold.

27. The non-transitory processor-readable medium of claim 26, wherein the stored processor-executable instructions are configured to cause the processor to perform operations further comprising:

inhibiting the D2D communication with the target device in response to determining that the received power level from the target device is not above the received power level threshold.

28. The non-transitory processor-readable medium of claim 26, wherein the stored processor-executable instructions are configured to cause the processor to perform operations such that determining whether the received power level of the signal from target devices for D2D communication is above the received power level threshold comprises:

obtaining one or more of: a received power ($P_{RX}$) level, a received signal strength indicator (RSSI), and a signal to noise ratio (SNR) of the received signal from target devices; and comparing the obtained one or more of the $P_{RX}$ level, the RSSI, and the SNR with the received power level threshold.

29. The non-transitory processor-readable medium of claim 26, wherein the stored processor-executable instructions are configured to cause the processor to perform operations such that permitting D2D communications with target devices in response to determining that the received power level from target devices is above the received power level threshold comprises adding target devices to a list of target devices with which D2D communication is permitted in response to the received power level of the received signal from target devices being above the received power level threshold.

30. The non-transitory processor-readable medium of claim 27, wherein the stored processor-executable instructions are configured to cause the processor to perform operations such that inhibiting D2D communications with the target device in response to determining that the received power level from the target device is not above the received power level threshold comprises one or more of: removing target devices from a list of target devices with which D2D communication is permitted; and not adding target devices to the list of target devices with which D2D communication is permitted.

* * * * *